US011124114B2

(12) United States Patent
Frazier et al.

(10) Patent No.: US 11,124,114 B2
(45) Date of Patent: Sep. 21, 2021

(54) BLIND SPOT DETECTION AND ALERT

(71) Applicant: Ford Global Technologies, LLC, Dearborn, MI (US)

(72) Inventors: Nicholas Frazier, Ann Arbor, MI (US); Jeremy Lerner, Southfield, MI (US); Taylor Hawley, Dearborn, MI (US); Joseph Gifford, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/588,376

(22) Filed: Sep. 30, 2019

(65) Prior Publication Data

US 2021/0094472 A1    Apr. 1, 2021

(51) Int. Cl.
*B60Q 9/00* (2006.01)
*G08G 1/16* (2006.01)
*B60Q 1/34* (2006.01)
*B60R 1/12* (2006.01)

(52) U.S. Cl.
CPC .............. *B60Q 9/008* (2013.01); *B60Q 1/34* (2013.01); *B60R 1/1207* (2013.01); *G08G 1/167* (2013.01)

(58) Field of Classification Search
CPC ......... B60Q 9/008; B60R 21/013; B60R 1/02; B60R 1/1207; B62D 15/0255; G08G 1/167
See application file for complete search history.

(56) References Cited

U.S. PATENT DOCUMENTS

| 5,313,335 | A  |   | 5/1994  | Gray et al. |           |
|-----------|----|---|---------|-------------|-----------|
| 6,127,965 | A  | * | 10/2000 | McDade      | G01S 13/931 |
|           |    |   |         |             | 342/159   |
| 6,198,409 | B1 |   | 3/2001  | Schofield et al. |       |
| 6,744,353 | B2 | * | 6/2004  | Sjonell     | G01S 17/931 |
|           |    |   |         |             | 340/435   |
| 6,812,833 | B2 |   | 11/2004 | Rothkop et al. |        |
| 7,049,945 | B2 |   | 5/2006  | Breed et al. |          |
| 7,427,150 | B2 |   | 9/2008  | Carter et al. |         |
| 7,755,508 | B2 | * | 7/2010  | Watanabe    | B60Q 1/2665 |
|           |    |   |         |             | 340/903   |
| 8,645,001 | B2 |   | 2/2014  | Basson et al. |         |
| 9,487,139 | B1 | * | 11/2016 | Ishida      | B60W 30/08 |
| 9,511,711 | B2 | * | 12/2016 | Petrillo    | B60Q 9/008 |
| 9,840,192 | B2 | * | 12/2017 | Downey      | B60Q 1/525 |
| 9,878,665 | B2 | * | 1/2018  | Orellana    | B60Q 9/008 |
| 9,925,920 | B2 |   | 3/2018  | Lei et al.  |           |

(Continued)

OTHER PUBLICATIONS

Forkenbrock, et al. (Jul. 2014). Blind spot monitoring in light vehicles—System performance. (Report No. DOT HS 812 045). Washington, DC: National Highway Traffic Safety Administration (85 pages).

*Primary Examiner* — Hoi C Lau
(74) *Attorney, Agent, or Firm* — Frank Lollo; Eversheds Sutherland (US) LLP (57) ABSTRACT

Blind spot detection and alert systems, devices, and methods are provided herein. An example device includes an optical surface having a plurality of indicator elements; and a controller having a processor and a memory for storing instructions, the processor executing the instructions to control a visual attribute of at least a portion of the plurality of indicator elements displayed on the optical surface to indicate a second vehicle being in a blind-spot of a first vehicle for a period of time.

18 Claims, 5 Drawing Sheets

(56) References Cited

U.S. PATENT DOCUMENTS

| | | | |
|---|---|---|---|
| 9,987,981 B1 * | 6/2018 | Deyaf | B60Q 5/006 |
| 9,987,985 B2 * | 6/2018 | Goo | B60K 35/00 |
| 10,474,154 B1 * | 11/2019 | Wengreen | G05D 1/0287 |
| 10,807,523 B2 * | 10/2020 | Nomura | B60Q 3/18 |
| 2002/0186480 A1 * | 12/2002 | Jacobs | B60R 1/02 |
| | | | 359/843 |
| 2003/0052773 A1 * | 3/2003 | Sjonell | G01S 17/931 |
| | | | 340/435 |
| 2007/0058257 A1 * | 3/2007 | Lynam | B60R 1/0602 |
| | | | 359/604 |
| 2007/0290823 A1 * | 12/2007 | Watanabe | G08G 1/166 |
| | | | 340/435 |
| 2008/0231703 A1 * | 9/2008 | Nagata | H04N 7/181 |
| | | | 348/148 |
| 2009/0063053 A1 * | 3/2009 | Basson | B60Q 9/008 |
| | | | 702/1 |
| 2011/0128142 A1 * | 6/2011 | Byun | B60R 1/12 |
| | | | 340/475 |
| 2014/0139669 A1 * | 5/2014 | Petrillo | B60R 1/00 |
| | | | 348/148 |
| 2014/0218213 A1 * | 8/2014 | Schneider | G08G 1/0967 |
| | | | 340/905 |
| 2015/0228066 A1 * | 8/2015 | Farb | H04N 5/232941 |
| | | | 348/148 |
| 2015/0232021 A1 * | 8/2015 | Downey | B60Q 1/525 |
| | | | 340/903 |
| 2015/0274074 A1 * | 10/2015 | Petrillo | B60R 1/00 |
| | | | 701/36 |
| 2016/0075235 A1 * | 3/2016 | Takamatsu | B60K 35/00 |
| | | | 340/438 |
| 2016/0084661 A1 * | 3/2016 | Gautama | G01C 21/365 |
| | | | 701/400 |
| 2016/0332569 A1 * | 11/2016 | Ishida | B60W 30/08 |
| 2017/0076599 A1 * | 3/2017 | Gupta | B60C 9/00 |
| 2017/0088053 A1 * | 3/2017 | Orellana | B60R 1/12 |
| 2017/0120803 A1 * | 5/2017 | Kentley | B60W 10/18 |
| 2017/0222612 A1 * | 8/2017 | Zollner | G08G 1/167 |
| 2017/0267173 A1 * | 9/2017 | Goo | B60R 1/12 |
| 2018/0126965 A1 * | 5/2018 | Tsuji | G01P 3/487 |
| 2018/0147984 A1 * | 5/2018 | Himi | B62D 15/0255 |
| 2018/0201192 A1 * | 7/2018 | Ishida | B60R 1/08 |
| 2018/0339656 A1 * | 11/2018 | Alarcon | B60R 1/00 |
| 2019/0031102 A1 * | 1/2019 | Kishimoto | H04N 5/232 |
| 2019/0139412 A1 * | 5/2019 | Huang | G08G 1/166 |
| 2019/0168666 A1 * | 6/2019 | Nomura | B60R 13/0243 |
| 2019/0202358 A1 * | 7/2019 | Arndt | B60R 1/12 |

* cited by examiner

BLIND SPOT DETECTION AND ALERT

TECHNICAL FIELD

The present disclosure relates to systems, devises, and methods that detect vehicle-to-vehicle proximity and provide multi-faceted displays that provide situational or contextual information to a driver.

BACKGROUND

Accidents or other deleterious activities can occur when one vehicle is present in the blind spot of another adjacent vehicle. A safety feature in vehicles includes an indicator that informs a driver if another vehicle is located in the driver vehicle's blind spot. This information is very useful to the driver and provides binary information; a vehicle is in the blind spot or not. Vehicles can persist in the blind spot for varying periods of time. Relative motion of adjacent vehicles can result in vehicles advancing and/or retreating relative to a blind spot of a vehicle. This relative motion can complicate a driver's decision-making process when determining if an action, such as a lane merge should occur.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems, devices, and methods disclosed herein are configured to detect vehicle-to-vehicle activity and/or proximity and provide situational or contextual information to a driver related to such activity. These systems, devices, and methods increase overall driver situational awareness and reduce likely collisions that may occur in the absence of such situational or contextual information.

In one example embodiment, a multi-faceted display of situational information regarding a first location, such as blind spot, or other boundary zones around a vehicle of interest is facilitated. This can include one or more vehicles being in a blind spot of a vehicle of interest. In various embodiments, the multi-faceted display includes a display of blind spot situational or contextual information. The multi-faceted display can be incorporated into an optical surface. For example, a multi-faceted display could be incorporated into a side view mirror, a rearview mirror, a head's up display (HUD), or a human-machine interface (HMI) such as an infotainment center.

Generally, a first vehicle comprises one or more sensors that are configured to determine the presence of an adjacent vehicle in blind spot of the first vehicle. Moreover, some embodiments include sensors that are capable of providing signals or output that can be analyzed to determine situational or contextual information. Examples of situational or contextual information include whether the adjacent vehicle is advancing into or retreating from a blind spot of the first vehicle, how long the adjacent vehicle has been present in the blind spot, or other similar situational or contextual information. Thus, while the binary determination of an adjacent vehicle being in the blind spot can be determined and displayed to the driver in a visual format, additional situational or contextual information can also be displayed, thus creating a multi-faceted display.

In some embodiments, a multi-faceted display of the present disclosure can include a plurality of indicators, where each indicator provides at least one aspect of blind spot situational or contextual information. Collectively, the plurality of indicators provide the driver with a robust understanding of activity occurring in their blind spots. In some embodiments, the plurality of indicators includes at least one physical indicator such as light emitting elements. In some embodiments, the plurality of indicators includes at least one graphical user interface or virtual elements displayed or projected onto an optical surface. In other embodiments, the plurality of visual indicators include combinations of both physical and/or virtual elements.

According to some embodiments, some of the indicators used in a display can have at least one visual attribute adjusted on a dynamic or real-time basis in response to the blind spot situational or contextual information determined. For example, an indicator can have a selectively adjustable hue that changes in response to how long an adjacent vehicle has been in a blind spot of a first vehicle.

ILLUSTRATIVE EMBODIMENTS

Figure 1:
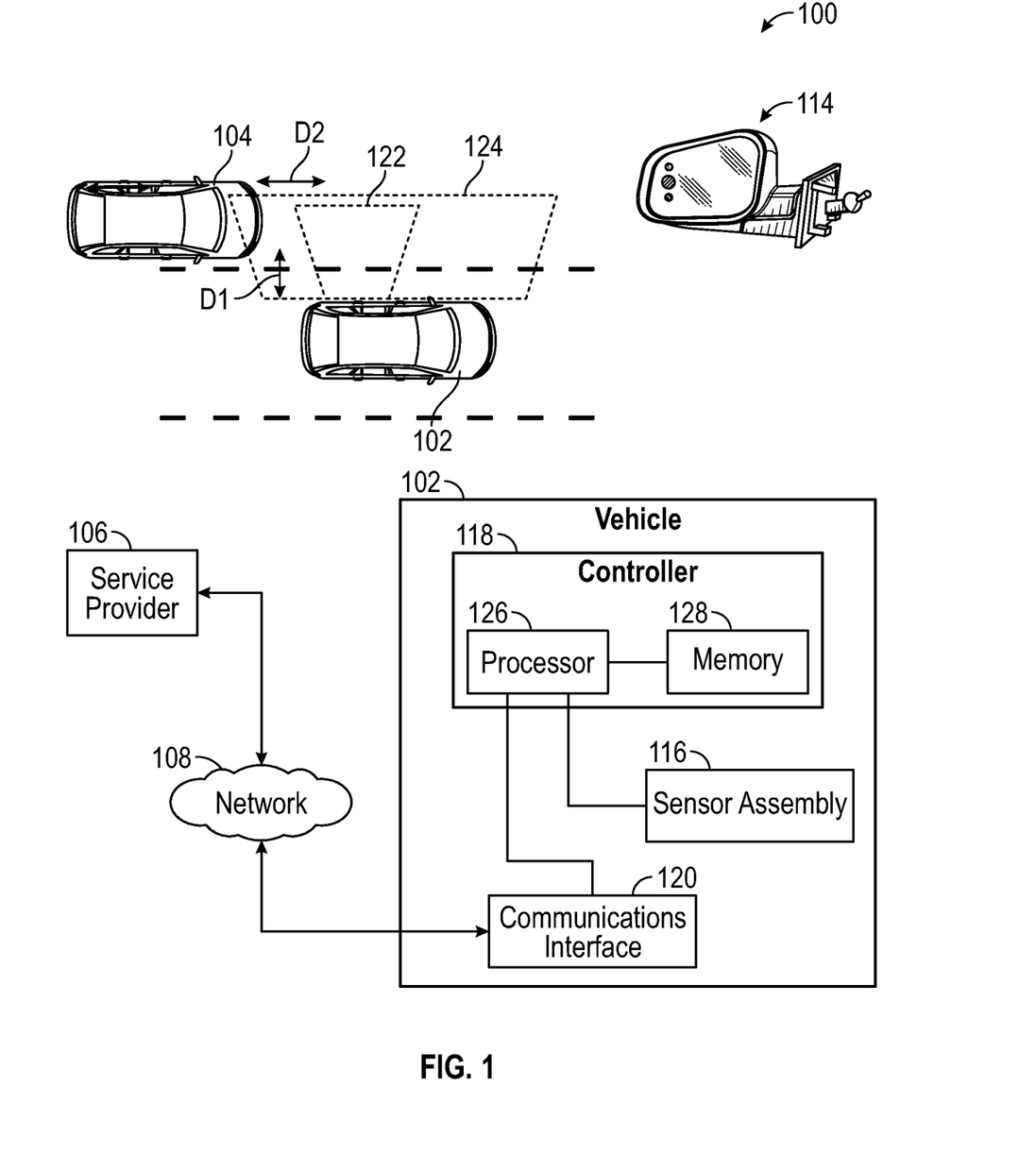
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The illustrative architecture 100 may include a first vehicle 102, a second vehicle 104, a service provider 106, and a network 108. Additional vehicles can be present in some embodiments.

Components of the architecture 100, such as the first vehicle 102, the second vehicle 104, and the service provider 106 may communicate with one another over a network 108. The network 108 may include any one or a combination of multiple different types of networks, such as cable networks, the Internet, wireless networks, and other private and/or public networks. In some instances, the network 108 may include cellular, Wi-Fi, or Wi-Fi direct. In the context of the first vehicle 102 and the second vehicle 104, the network 108 could include local vehicle-to-vehicle (V2V) communications. In another example, the first vehicle 102 and/or the second vehicle 104 can communicate indirectly using vehicle-to-infrastructure (V2I or V2X) communications, which could be mediated through the service provider 106.

For example, the service provider 106 could include a roadside infrastructure device that facilitates V2I or V2X communications. Thus, the first vehicle 102 and/or the second vehicle 104 could be a connected vehicle using any V2V, V2I, and/or V2X communication protocol. In some embodiments, a vehicle of interest, such as the first vehicle 102 can be configured to provide blind spot situational information to its driver according to the present disclosure, while the second vehicle 104 is a legacy or non-connected vehicle. Also, while embodiments consider determining the presence of a vehicle in the blind spot of another vehicle, the present disclosure is not so limited, but could be adapted to determine the blind spot situational information relative to other objects such as motorcycles, pedestrians, and/or bicycles that may also be present in the blind spot of a vehicle. In yet other embodiments, the first vehicle 102 and the second vehicle 104 are configured similarly to one another.

In general, the vehicle 102 can comprise any vehicle that may have an optical surface (such as a side view mirror 114) for providing a multi-faceted display (see FIGS. 2-7), a sensor assembly 116, a controller 118, and a communications interface 120 (an optional feature for some embodiments). The optical surface could include a side view mirror, a rearview mirror, a head's up display (HUD), or a human-machine interface (HMI) such as an infotainment center. For purposes of brevity and clarity, many, if not all examples provided herein will reference the side view mirror 114. Indeed, any of the other optical surfaces disclosed above can likewise be utilized in accordance with the present disclosure. In one specific embodiment, the optical surface could include a specific purpose display that is integrated or otherwise associated with an A-pillar of a vehicle. In general, the A-pillar is a structural member of the vehicle that is in the leftmost view of the driver and exists between the front windshield and the driver's side window.

The sensor assembly 116 can include one or more sensors that are configured to directly or indirectly provide signals that can are indicative of a distance between a vehicle of interest, such as the first vehicle 102 and an adjacent vehicle, such as the second vehicle 104. In some embodiments, the one or more sensors can be specifically directed to sensing the presence of objects, such as the second vehicle 104, in a blind spot 122 of the first vehicle 102. The shape and size of the blind spot 122 may vary with vehicle design and driver position within the vehicle.

Thus, in some embodiments, the one or more sensors may sense the presence of objects in a zone of concern 124 that includes areas both ahead, behind, and adjacent to the first vehicle 102. Thus, one or more sensors can sense objects behind but approaching the first vehicle 102, as well as objects adjacent to the first vehicle 102. The one or more sensors can sense objects ahead of the first vehicle 102. To be sure, the relativeness of whether an object is ahead or behind the first vehicle 102 can be determined with respect to the blind spot 122 or zone of concern 124. In various embodiments, the zone of concern 124 includes the blind spot 122. Example sensors can include, but are not limited to, radar, LIDAR, ultrasonic, time-of-flight (TOF), camera, and combinations or permutations thereof. In one embodiment, the sensor assembly 116 includes any one or combination of sensors positioned across various parts of the first vehicle 102. For example, radar and side view camera feeds can be synthesized by the controller 118 to create the information necessary to control the multi-faceted displays disclosed herein.

In some embodiments, the controller 118 may comprise a processor 126 and memory 128. The memory 128 stores instructions that are executed by the processor 126 to perform aspects of blind spot detection, situational and/or contextual information analysis, and/or multi-faceted visual depiction as disclosed throughout. When referring to operations executed by the controller 118 it will be understood that this includes the execution of instructions by the processor 126.

According to some embodiments, the controller 118 can obtain output from the sensor assembly 116 and determine if one or more objects are within the zone of concern 124 and/or within the blind spot 122 of the first vehicle 102. Generally described, either or both of the zone of concern 124 and/or within the blind spot 122 can be referred to generally as a first location. Some embodiments of the present disclosure may include determining the presence of the second vehicle 104 in a first location (zone of concern 124 and/or the blind spot 122) in proximity to the first vehicle 102.

For example, if the sensor assembly 116 implements proximity sensors, the controller 118 can obtain this sensor output and analyze the same to determine if the object(s) and the first vehicle 102 are proximately located relative to one another such that the object is near or within the blind spot 122 of the first vehicle 102. Examples of proximity data could include ultrasonic sensor output, LIDAR, radar, infrared, or other similar data that are indicative of a relative distance between two objects. The controller 118 can establish virtual geographical boundaries, such as geofences that define the size and shape of the zone of concern 124 and/or the blind spot 122. The proximity data may indicate that the first vehicle 102 and/or one or more objects are inside (partially or entirely) one or both of these virtual geographical boundaries. As these data are obtained over a period of time, the controller 118 can determine how long the adjacent object (such as the second vehicle 104) has been in the zone of concern 124 and/or the blind spot 122. In general, proximity refers to a distance between the first vehicle 102 and the second vehicle 104. The proximity can also refer to a distance the second vehicle 104 and the zone of concern 124 and/or the blind spot 122.

In another example, the sensor assembly 116 can utilize location/position data of the first vehicle 102 and/or adjacent objects to determine if one or more objects are within the zone of concern 124 and/or the blind spot 122. For example, global positioning system (GPS) data can be obtained from an associated vehicle sub-system of the first vehicle 102. GPS data for an adjacent object can also be processed by the controller 118 to determine if the one or more objects are within a virtual geographical boundary or are within a specified threshold distance from the first vehicle 102.

In one embodiment, GPS location/position data of the second vehicle 104 can be obtained directly from the second vehicle 104 or from the service provider 106. In various embodiments, each vehicle or object in a given area may report its location/position data to the service provider 106, which in turn relays the same (periodically or upon request) to the first vehicle 102 or adjacent objects.

Distance measurements (e.g., proximity values) can include both lateral and longitudinal components. Thus, the distance between the first vehicle 102 and an object can be determined in two directions. In one axis, a lateral distance D1 can be determined, which represents how far away the first vehicle 102 is to the adjacent object such as the second vehicle 104. This data can be used to determine if an adjacent object is in a position that would prevent the first vehicle 102 from merging laterally. In the longitudinal axis distance D2, the proximity/distance measurement represents how far ahead or behind the adjacent object is relative to the first vehicle 102.

In another example embodiment, if the adjacent object is the second vehicle 104, the first vehicle 102 and the second vehicle 104 may exchange location/position data with one another using V2V communications, or alternatively V2I or V2X communications through the service provider 106.

In addition to determining relative positions of the first vehicle 102 and one or more adjacent objects, the controller 118 can obtain or determine velocity data for both the first vehicle 102 and one or more adjacent objects. In an example embodiment, a velocity of the first vehicle 102 is determined by the controller 118 from an associated vehicle sub-system. The controller 118 can obtain velocity data for the second vehicle 104 from V2V communications. In another example embodiment, the controller 118 can calculate velocity data for the second vehicle 104 from output of the sensor assembly 116 obtained over a period of time. Relative velocity can be used by the controller 118 to determine if the second vehicle 104 is advancing or retreating relative to the zone of concern 124 and/or the blind spot 122.

Used in combination, the controller 118 can utilize both the relative positions and/or distance between the first vehicle 102 and the second vehicle 104, along with the relative velocities to provide the driver with blind spot situational information. In some embodiments, the controller 118 can provide this blind spot situational information through a multifaceted informational display provided on the side view mirror 114. Each of the following descriptions of FIGS. 2-7 may reference elements of FIG. 1.

Figure 2:
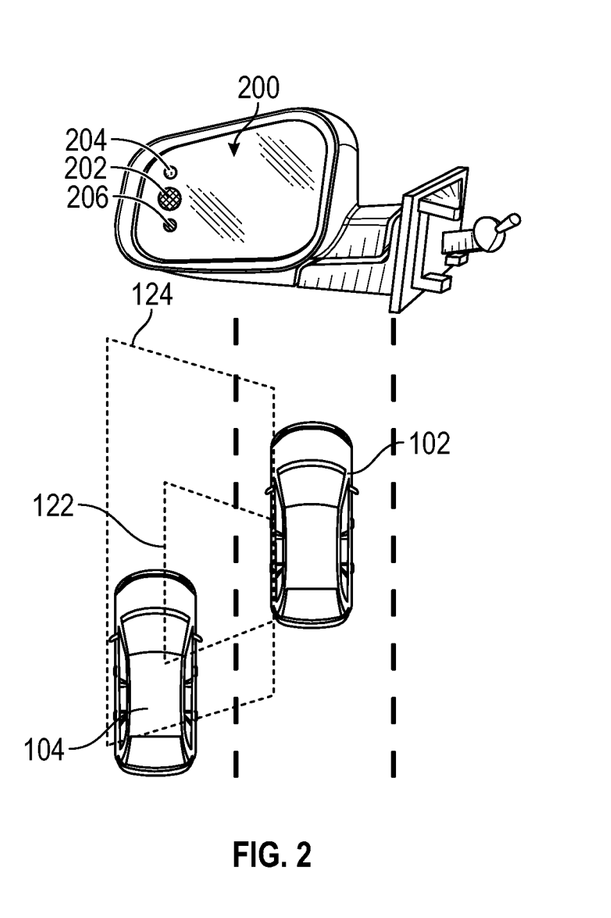
FIG. 2 schematically depicts a use case of the present disclosure, along with another multi-faceted display.

FIG. 2 is a schematic diagram of an example scenario where the second vehicle 104 is within both the zone of concern 124 and, specifically within the blind spot 122 of the first vehicle 102. In this example, an example multifaceted informational display 200 is provided on the side view mirror 114. In this example, the multifaceted informational display 200 includes a first indicator element 202. The first indicator element 202 can include a light emitting member, such an LED. The first indicator element 202 can be controlled by the controller 118 to indicate the presence of the second vehicle 104 in the blind spot 122 of the first vehicle 102 based on sensor data.

In some embodiments, the controller 118 can selectively adjust a hue or other visual attribute of the first indicator element 202 to indicate a duration of the period of time that the second vehicle 104 has been in the blind spot 122 of the first vehicle 102. In one embodiment, the controller 118 can selectively adjust a contrast, a color/hue, or an intensity (luminousness) of the first indicator element 202 as the duration increases. For example, the hue of the first indicator element 202 is selected as a first hue and contrast level when the duration is zero to thirty seconds. The hue can be selectively changed by the controller 118 to a second hue and contrast level when the duration is thirty seconds to one minute. Other example ranges of time (both relative to duration and number) can also be utilized. In one specific example, the controller 118 can darken the first indicator element 202 as the duration of time of the second vehicle 104 within the blind spot 122 of the first vehicle 102 increases. Thus, the contrast and/or the hue of the first indicator element may be changed based on the duration of the period of time for which the second vehicle is present in the zone of concern 124 and/or the blind spot 122.

In one example embodiment, a hue of the first indicator element 202 can be changed based on the lateral distance D1 determined between the first vehicle 102 and the second vehicle 104. For example, if the second vehicle 104 begins to drift into the lane of the first vehicle 102, the controller 118 may change a hue of the first indicator element 202 from a green tone to a red tone.

Figure 4:
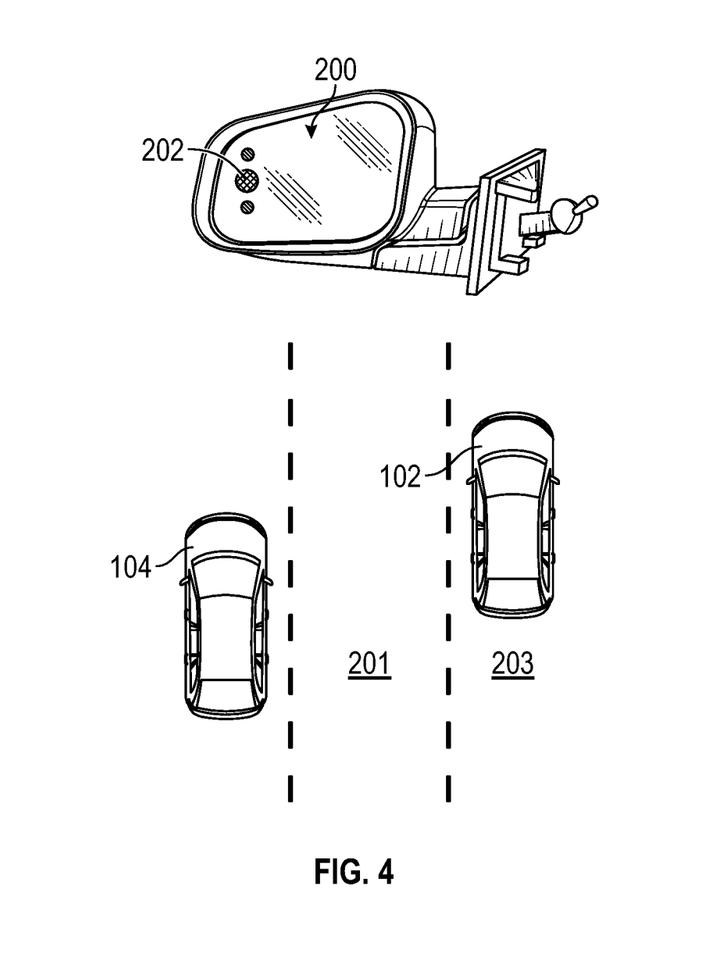
FIGS. 4 and 5 collectively depict use of a multi-faceted display to provide situational information regarding how long a vehicle has been in the blind spot of another vehicle.
Figure 5:
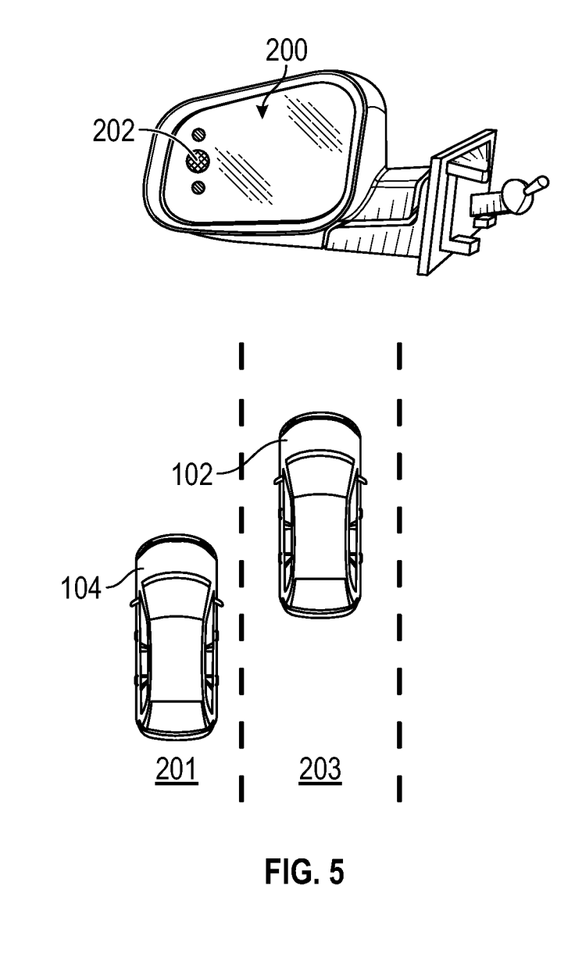

FIGS. 4 and 5 collectively illustrate a contrast adjustment process as disclosed above. For example, in FIG. 4, the first indicator element 202 has a first contrast level. In FIG. 5, the first indicator element 202 has a second contrast level that is darker than the first contrast level. To be sure, the shape and size of the indicator element in any specific embodiment disclosed herein can be selected for purposes of aesthetics or personal preference. For example, a driver could adjust a size or location of the indicator element(s) of a display of the present disclosure based on their personal preferences. In one embodiment, the size or shape of the indicator element (s) could vary depending on the eyesight of the driver. Also, rather than providing changes in hue or contrast, an indicator element could be otherwise controlled by the controller 118 to indicate situational information, such as duration within a blind spot. In one example, the second vehicle 104 can enter the blind spot of the first vehicle 102 when the second vehicle 104 merges into a lane 201 that is adjacent to a lane 203 in which the first vehicle is located.

For example, a size of the first indicator element 202 may increase as an object within the blind spot of the first vehicle 102 persists. In another example, rather than (or in addition to) shape, hue, or contrast change, the controller 118 may set a blink rate for an indicator element. The period between blinks may vary according to the duration of the object within the blind spot or in response to how closely the object is determined laterally to the first vehicle 102.

Referring back to FIG. 2, the multifaceted informational display 200 can comprise a second indicator element 204 and a third indicator element 206. The second indicator element 204 can be disposed above the first indicator element 202, while the third indicator element 206 can be disposed below the first indicator element 202. The controller 118 can be configured to activate either or both of the second indicator element 204 and/or the third indicator element 206 using data such as relative vehicle velocities.

In this example, the second vehicle 104 is approaching and overtaking the first vehicle 102. Due to the calculation of relative velocities, the controller 118 determines that the second vehicle 104 is traveling at a speed that is greater than that of the first vehicle 102. Thus, the second vehicle 104 is advancing relative to the blind spot 122 of the first vehicle 102. The second indicator element 204 can be activated by the controller 118. In some embodiments, the second indicator element 204 has a hue that is unique relative to either the first indicator element 202 or the third indicator element 206. For example, the second indicator element 204 can be green, whereas the third indicator element 206 may be red.

When the second indicator element 204 is activated by the controller 118, the driver is provided with situational information. The situational information may indicate to the driver of the first vehicle 102 that the second vehicle 104 may eventually move out of the blind spot 122 and may become visible. The situational information may also indicate to the driver of the first vehicle 102 that the second vehicle 104 is likely to be out the zone of concern 124, which would allow for the driver of the first vehicle 102 to merge into the adjacent lane in which the second vehicle 104 is currently present. In combination, the first indicator element 202 can provide the driver of the first vehicle 102 with an indication of if the second vehicle 104 is present in the blind spot 122, as well as how long the second vehicle 104 has been present in the blind spot 122. At the same time, the second indicator element 204 provides the driver with information as to whether the second vehicle 104 is advancing or retreating from the blind spot 122.

Figure 3:
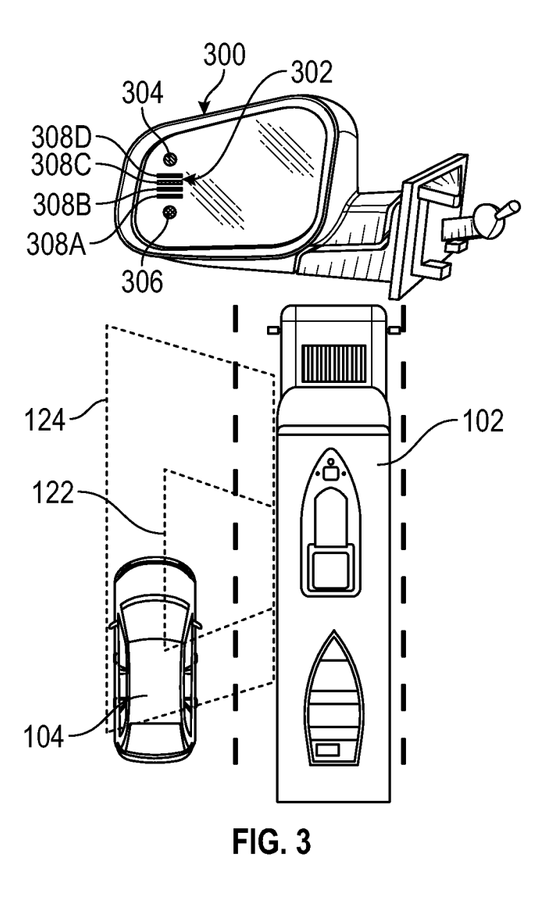
FIG. 3 schematically depicts another use case of the present disclosure, along with another example multi-faceted display.

FIG. 3 is a schematic diagram of an example scenario where the second vehicle 104 is within both the zone of concern 124 and, specifically within the blind spot 122 of the first vehicle 102. FIG. 3 also illustrates an example multifaceted informational display 300 provided on the side view mirror 114. In this example, the multifaceted informational display 300 includes a first indicator element 302, a second indicator element 304, and a third indicator element 306. To be sure, the second and third indicator elements 302 and 304 provide similar functionalities as those described above with respect to FIG. 2, namely an indication of relative speed between the first vehicle 102 and the second vehicle 104. In contrast with the embodiment of FIG. 2, the first indicator element 302 comprises a plurality of segments 308A-308D. The first indicator element 302 can be controlled by the controller 118 to provide situational information as to where the second vehicle 104 is in relation to the first vehicle 102. Thus, rather than successively darkening or changing a hue or other visual attribute of the first indicator element 302, the controller 118 can illuminate a portion or all of the plurality of segments 308A-308D to indicate a position of the second vehicle 104 relative to the first vehicle 102 (and specifically in some instances relative to the blind spot 122). The number of segments 308A-308D illuminated by the controller 118 can be based on a relative position of the second vehicle 104 to the blind spot 122. When the second vehicle 104 is entering or exiting the blind spot 122 (either from above or below), only a portion of the plurality of segments 308 may be illuminated. For example, if the second vehicle 104 is retreating away from the blind spot 122, only segments 308A and 308B may be illuminated. As the first vehicle 104 advances away, segment 308B may be deactivated, as well as segment 308A when the second vehicle 104 is completely outside the blind spot 122.

Conversely, additional segments can be illuminated if the second vehicle 104 were determined by the controller 118 to be advancing into the blind spot 122. These features can be combined with hue/color selection features disclosed above. Thus, the controller 118 can selectively adjust a hue of illuminated ones of the segments in response to how long the second vehicle 102 has been in position within the blind spot 122. In this example, a hue of segments 308A and 308B may be changed over time if the second vehicle 104 persists in its relative position to the first vehicle 102 rather than retreating.

In one example, color of the various indicator elements can be darkened to correlate to an amount of time an adjacent vehicle has spent in the blind spot of another vehicle. Using an example provided above, radar and side view camera feeds can be synthesized by the controller 118 to create the information necessary to control the multifaceted informational display 300.

Figure 6:
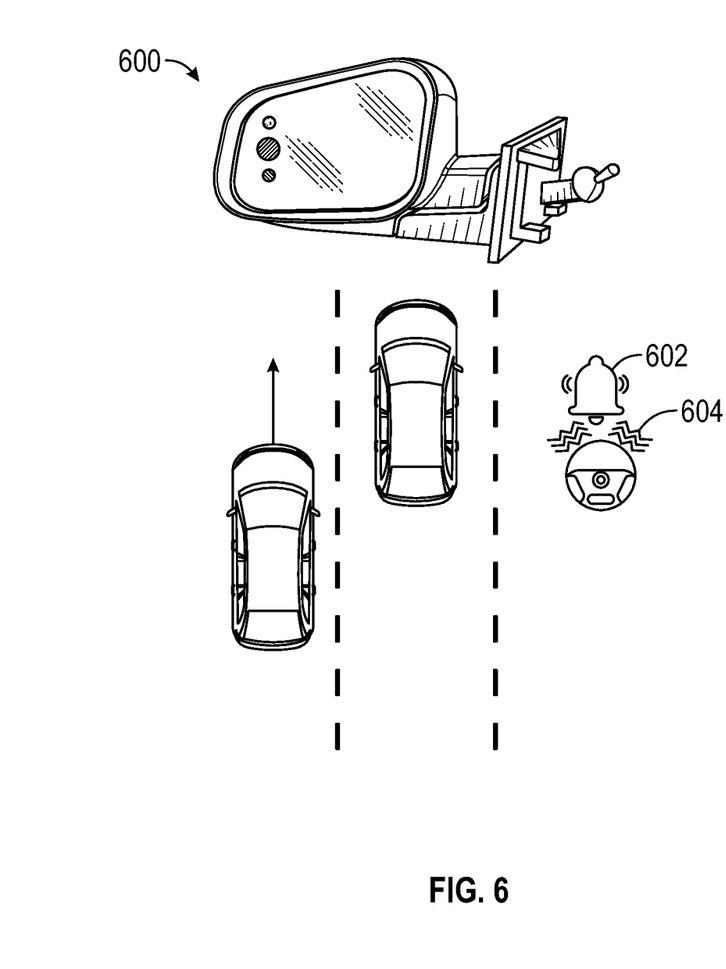
FIGS. 6 and 7 each schematically illustrate the use of audible and/or tactile feedback in combination with a multi-faceted display.
Figure 7:
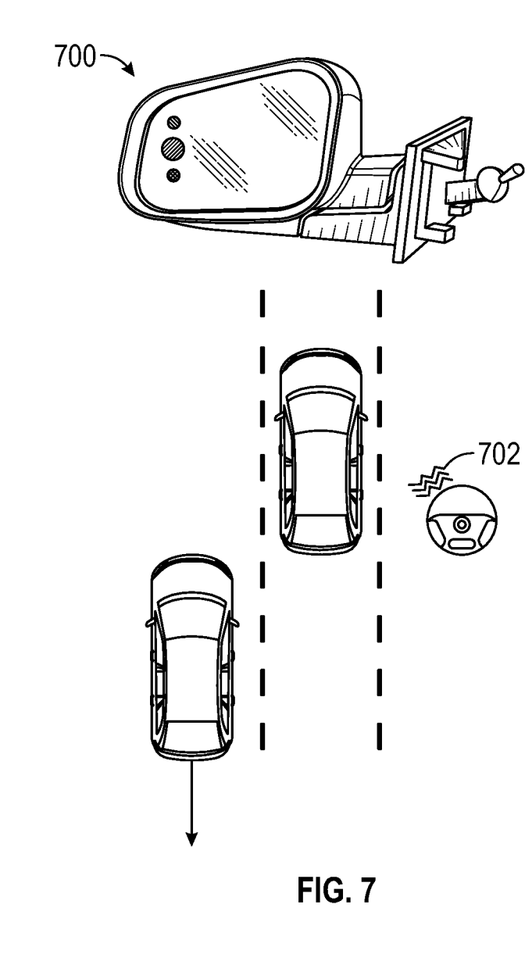

In some embodiments, the controller 118 can determine relative speed and position of adjacent vehicles to raise or lower an intensity of a lane change warning systems (tones or wheel vibrations). When a turn signal is indicated, the intelligent blind spot information plus varying the degrees of lane changing warnings can provide the driver with more situational awareness and confidence about their desired maneuvers. Referring to FIG. 6, when the controller 118 determines that the driver has activated a turn signal of the first vehicle 102, the controller 118 can combine this information with the relative position and speed of any adjacent vehicles, such as the second vehicle 104 to determine if a plurality of warnings can be utilized in combination with a multifaceted informational display 600. In this example, both a tone 602 and steering wheel vibration 604 are utilized. These features may be utilized collectively when the second vehicle 104 is advancing relative to the blind spot 122. Conversely, as illustrated in FIG. 7, only a steering wheel vibration 702 is used in combination with a multifaceted informational display 700. In this example, the second vehicle 104 is retreating relative to the blind spot 122.

Figure 8:
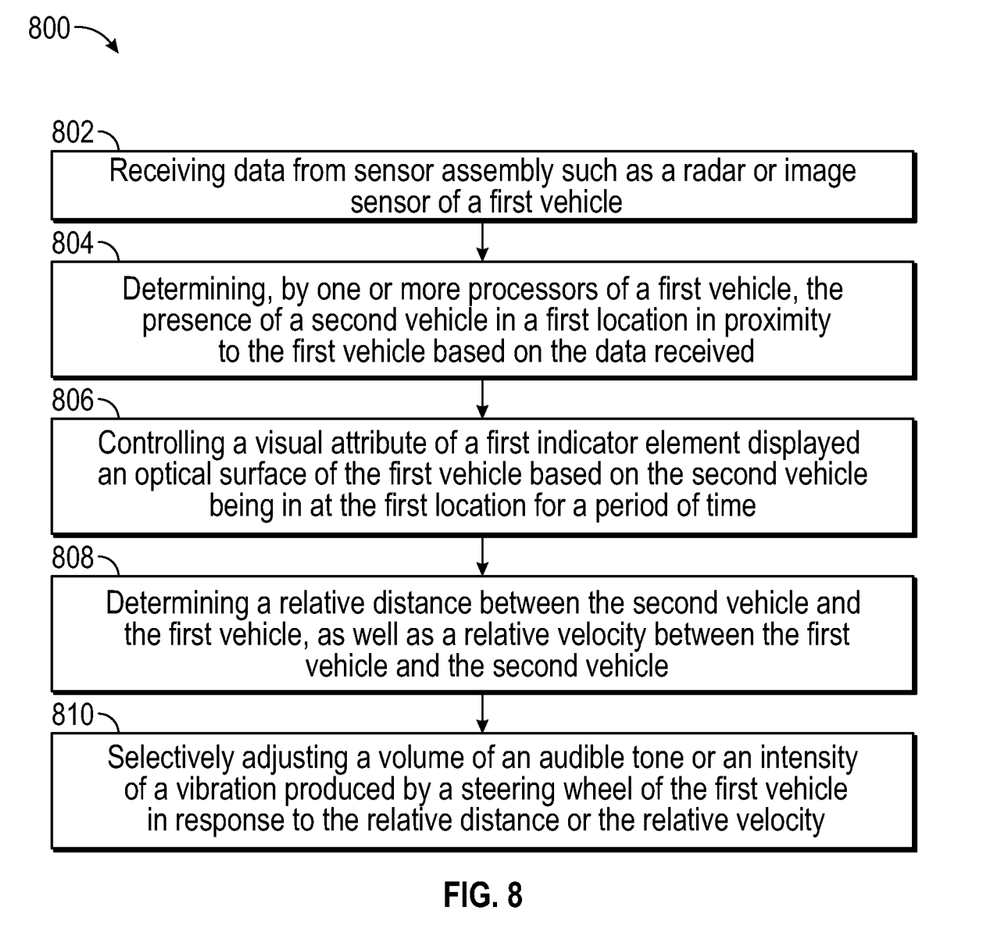
FIG. 8 is a flowchart of an example method of the present disclosure that includes veiling glare detection and remediation.

FIG. 8 is a flowchart of an example method of the present disclosure. The method can include a step 802 of receiving data from sensor assembly such as a radar or image sensor of a first vehicle that are indicative of the presence of the second vehicle in a first location. To be sure, the first location could include a blind spot of the first vehicle, or any other specified area around the first vehicle. The proximity between the first and second vehicles can be determined based on lateral and/or longitudinal distance between the first and second vehicles.

The method includes a step 804 of determining, by one or more processors of a first vehicle, the presence of a second vehicle in a first location in proximity to the first vehicle based on the data received. As noted throughout, this can include using proximity and/or position/location sensors to determine presence of the second vehicle in the first location.

The method can also include a step 806 of controlling a visual attribute of a first indicator element displayed on an optical surface of the first vehicle based on the second vehicle being in at the first location for a period of time. In one embodiment, a contrast or the hue of the first indicator element is changed based on a duration of the period of time.

In some embodiments, the visual attribute of a second indicator element can be adjusted to indicate if the second vehicle is advancing into or retreating from the first location. Thus, in some embodiments, a multi-faceted visual display can be provided that delivers to a driver situational information regarding blind spot activity.

In various embodiments, the method can include a step 808 of determining a relative distance between the second vehicle and the first vehicle, as well as a relative velocity between the first vehicle and the second vehicle. Next, the method can include a step 810 of selectively adjusting a volume of an audible tone or an intensity of a vibration produced by a steering wheel of the first vehicle in response to the relative distance or the relative velocity. Thus, in addition to providing a multi-faceted visual display, additional audible or tactile feedback can be provided to a driver. To be sure, steps 808 and 810 are optional in this embodiment.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
   determining, by one or more processors of a first vehicle, a presence of a second vehicle in a first location in proximity to the first vehicle; and
   controlling a visual attribute of a first indicator element displayed on an optical surface of the first vehicle based on the second vehicle being at the first location for a period of time, wherein the first indicator element comprises a plurality of segments that are individually controllable to indicate a position of the second vehicle relative to a blind spot of the first vehicle;
   wherein a first segment of the plurality of segments is illuminated indicating that the second vehicle is entering the blind spot, and a second segment of the plurality of segments is illuminated indicating that the second vehicle is exiting the blind spot.

2. The method according to claim 1, wherein controlling the visual attribute includes selectively adjusting a contrast or a hue of the first indicator element.

3. The method according to claim 2, further wherein the contrast or the hue of the first indicator element is changed based on a duration of the period of time.

4. The method according to claim 1, further comprising:
   determining that a turn signal of the first vehicle is activated; and
   vibrate a steering wheel of the first vehicle or output an audible tone by a sound sub-assembly of the first vehicle based on whether the second vehicle is advancing or retreating.

5. The method according to claim 4, further comprising controlling a visual attribute of a second indicator element to indicate if the second vehicle is advancing into or retreating from the first location.

6. The method according to claim 1, wherein the presence of the second vehicle in the first location of the first vehicle is determined from vehicle-to-vehicle messages exchanged between the first vehicle and the second vehicle.

7. The method according to claim 1, further comprising receiving data from a radar or image sensor of the first vehicle that are indicative of the presence of the second vehicle.

8. The method according to claim 1, further comprising:
   determining a relative distance between the second vehicle and the first vehicle, as well as a relative velocity between the first vehicle and the second vehicle; and
   selectively adjusting a volume of an audible tone or an intensity of a vibration produced by a steering wheel of the first vehicle in response to the relative distance or the relative velocity.

9. The method according to claim 1, wherein a contrast or a hue of the first indicator element is changed based on a lateral distance determined between the first vehicle and the second vehicle.

10. A system, comprising:
    a processor; and
    a memory for storing instructions, the processor executing the instructions to:
    determine, by one or more processors of a first vehicle, a presence of a second vehicle in a first location in proximity to the first vehicle; and
    control a visual attribute of a first indicator element displayed on an optical surface of the first vehicle based on the second vehicle being at the first location for a period of time, wherein the first indicator element comprises a plurality of segments that are individually controllable to indicate a position of the second vehicle relative to a blind spot of the first vehicle:
    wherein a first segment of the plurality of segments is illuminated indicating that the second vehicle is entering the blind spot, and a second segment of the plurality of segments is illuminated indicating that the second vehicle is exiting the blind spot.

11. The system according to claim 10, wherein the processor determines the presence of the second vehicle from images obtained by an image sensor of the first vehicle.

12. The system according to claim 10, wherein the processor determines the presence of the second vehicle from proximity signals obtained by a proximity sensor of the first vehicle.

13. The system according to claim 10, wherein the optical surface comprises a side-view mirror of the first vehicle.

14. The system according to claim 13, wherein the side-view mirror comprises a plurality of indicator elements that include the first indicator element, a second first indicator element that indicates if the second vehicle is advancing into or retreating from the first location.

15. A device, comprising:
    an optical surface having a plurality of indicator elements; and
    a controller comprising a processor and a memory for storing instructions, the processor executing the instructions to control a visual attribute of at least a portion of the plurality of indicator elements displayed on the optical surface to indicate a second vehicle being in a blind-spot of a first vehicle for a period of time, wherein a first indicator element comprises a plurality of segments, wherein the controller selectively illuminates the plurality of segments in response to a position of the second vehicle relative to the blind-spot;
    wherein a first segment of the plurality of segments is illuminated indicating that the second vehicle is entering the blind-spot, and a second segment of the plurality of segments is illuminated indicating that the second vehicle is exiting the blind-spot.

16. The device according to claim 15, wherein an attribute of the first indicator element varies according to a duration of the period of time.

17. The device according to claim 15, wherein the plurality of indicator elements comprises a second indicator element that indicates when the second vehicle is advancing relative to the blind-spot and a third indicator element that indicates when the second vehicle is retreating relative to the blind-spot.

18. The device according to claim 15, wherein the controller is further configured to:
    determine actuation of a turn signal;
    determine a distance between the first vehicle and the second vehicle; and
    perform a remediating action when the distance between the first vehicle and the second vehicle is lower than a threshold distance or when the second vehicle is advancing relative to the blind-spot.

\* \* \* \* \*